United States Patent
Chang et al.

(10) Patent No.: US 11,686,124 B2
(45) Date of Patent: Jun. 27, 2023

(54) METHOD AND SYSTEM FOR OPERATING KEY AND LOCK CORE WITH WIRELESS CHARGING

(71) Applicant: Zhuhai Unitech Power Technology Co., Ltd., Zhuhai (CN)

(72) Inventors: Qing Chang, Zhuhai (CN); Hongwei Qiao, Zhuhai (CN); Jing Zhang, Zhuhai (CN)

(73) Assignee: Zhuhai Unitech Power Technology Co., Ltd., Zhuhai (CN)

( * ) Notice: Subject to any disclaimer, the term of this patent is extended or adjusted under 35 U.S.C. 154(b) by 743 days.

(21) Appl. No.: 16/734,137

(22) Filed: Jan. 3, 2020

(65) Prior Publication Data
US 2020/0240174 A1    Jul. 30, 2020

Related U.S. Application Data

(60) Provisional application No. 62/798,971, filed on Jan. 30, 2019.

(51) Int. Cl.
*E05B 47/00* (2006.01)
*G07C 9/00* (2020.01)
(Continued)

(52) U.S. Cl.
CPC ...... *E05B 47/0006* (2013.01); *E05B 47/0012* (2013.01); *G07C 9/00182* (2013.01);
(Continued)

(58) Field of Classification Search
None
See application file for complete search history.

(56) References Cited

U.S. PATENT DOCUMENTS

| 6,457,337 | B1 | 10/2002 | Hattick et al. |
| 6,617,959 | B1 | 9/2003 | Liu |

(Continued)

FOREIGN PATENT DOCUMENTS

| CN | 102691445 A | 9/2012 |
| CN | 202672884 U | 1/2013 |

(Continued)

*Primary Examiner* — K. Wong
(74) *Attorney, Agent, or Firm* — Shun Yao; Yao Legal Services, Inc.

(57) ABSTRACT

One embodiment provides an electrical key for locking and unlocking an electrical lock. The electrical key includes an energy-transfer unit that includes a magnetic core and a coil wrapped around the magnetic core, a pulse generator configured to generate a first pulse sequence including alternating pulse on and pulse off cycles and a second pulse sequence comprising a continuous pulse train, and a modulator driver configured to modulate a voltage or current on the coil using the generated first or second pulse sequence, a measurement module configured to measure a current or voltage on the coil excited by the modulated voltage or current, respectively, a key-position determination module configured to determine a relative position between the electrical key and the electrical lock based on the measured current or voltage, and a communication interface for communicating with the electrical lock to facilitate the locking and unlocking of the electrical lock.

16 Claims, 8 Drawing Sheets

(51) Int. Cl.
*H01F 27/24* (2006.01)
*H02J 50/10* (2016.01)
*H01F 27/28* (2006.01)

(52) U.S. Cl.
CPC ............. *H01F 27/24* (2013.01); *H01F 27/28* (2013.01); *H02J 50/10* (2016.02); *E05B 2047/0058* (2013.01); *E05B 2047/0063* (2013.01); *E05B 2047/0067* (2013.01)

(56) References Cited

U.S. PATENT DOCUMENTS

| | | |
|---|---|---|
| 10,176,655 B2 | 1/2019 | Gullicksen |
| 2003/0021929 A1 | 1/2003 | Takahashi et al. |

FOREIGN PATENT DOCUMENTS

| | | | | |
|---|---|---|---|---|
| CN | 107305707 A | 10/2017 | | |
| CN | 105574959 B | 7/2018 | | |
| EP | 1468157 B1 | 5/2008 | | |
| GB | 2587634 A | * 4/2021 | ............. | H02J 50/12 |

* cited by examiner

METHOD AND SYSTEM FOR OPERATING KEY AND LOCK CORE WITH WIRELESS CHARGING

RELATED APPLICATION

This application claims the benefit of U.S. Provisional Application No. 62/798,971, entitled "Method and System for Operating Key and Lock Core with Wireless Charging," by inventors Qing Chang, Hongwei Qiao, and Jing Zhang, filed 30 Jan. 2019.

BACKGROUND

Field

The present disclosure relates to smart lock and key systems. More specifically, the present disclosure relates to the operations of a wireless powered electrical key and lock core.

RELATED ART

Electrical lock-and-key systems have been gaining popularity in recent years, especially since the development of smart home technologies. An electrical lock-and-key system can often include an electrical key and an electrical lock. During operation, electrical signals (e.g., electrical pulses) can be exchanged between the electrical lock and key to achieve the locking and unlocking operation. Moreover, the electrical key (which can include a built-in battery) can also provide power to the electrical lock (which is passive) to facilitate operations of the electrical lock. In existing electrical lock-and-key systems, an electrical key can provide power to the electrical lock via contact electrodes. Such electrical contact points, which can include bare metals, can facilitate the flow of electrical current. However, bare metals are prone to oxidation and corrosion, which can lead to operation failure or misoperation. Existing non-contact technologies rely on induction coils located on the key and lock to accomplish the transfer of power. However, the size of the coils can be relatively large, which can be cumbersome for the lock-and-key application. Although placing a magnetic core inside the coils can improve the energy-transfer efficiency, the resulting devices can still suffer from magnetic leakage and coil overheating. Moreover, a precise alignment between the coils is needed to reduce magnetic leakage, and achieving such a precise alignment often requires the detection of weak magnetic fields generated by the coils. This position-detection method requires additional external components (e.g., magnetic sensors), and the magnetic field used for the position detection can interfere with the inductive magnetic flux needed for power transfer.

SUMMARY

One embodiment of the present invention provides an electrical key for locking and unlocking an electrical lock. The electrical key can include an energy-transfer unit that includes a magnetic core and a coil wrapped around the magnetic core, a pulse generator configured to generate a first pulse sequence including alternating pulse on and pulse off cycles and a second pulse sequence comprising a continuous pulse train, a modulator driver configured to modulate a voltage or current on the coil wrapped around the magnetic core using the generated first pulse sequence. The modulator driver is further configured to modulate the voltage or current on the coil using the second pulse sequence to facilitate transferring of energy from the electrical key to the electrical lock. The electrical key can further include a measurement module configured to measure a current or voltage on the coil excited by the voltage or current, respectively, modulated using the first pulse sequence, a key-position determination module configured to determine a relative position between the electrical key and the electrical lock based on the measured current or voltage, and a communication interface for communicating with the electrical lock to facilitate the locking and unlocking of the electrical lock.

In a variation on this embodiment, determining the relative position between the electrical key and the electrical lock can include determining whether an end of the magnetic core of the electrical key is placed substantially adjacent to a corresponding end of a magnetic core within the electrical lock.

In a further variation, the measurement module can be configured to sample a waveform associated with the excited current or voltage, and the key-position determination module can determine the relative position between the electrical key and the electrical lock based on the sampled waveform.

In a further variation, the measurement module can be configured to obtain a magnitude of the excited current or voltage, and the key-position determination module can determine the relative position between the electrical key and the electrical lock based on the obtained magnitude.

In a variation on this embodiment, the pulse generator can be configured to generate the second pulse sequence in response to the key-position determination module determining that the electrical key is substantially close to the electrical lock.

In a variation on this embodiment, the communication interface can include a radio frequency (RF) communication interface, and the electrical key can be configured to transmit a locking or unlocking command to the electrical lock via the communication interface.

In a variation on this embodiment, the electrical key can further include an encryption module configured to encrypt communications between the electrical key and the electrical lock.

In a variation on this embodiment, the electrical key can further include a battery.

In a variation on this embodiment, the magnetic core can include a U-shaped magnetic core or a cylindrical magnetic core.

One embodiment of the present invention provides an electrical lock-and-key system. The system can include an electrical lock and an electrical key capable of locking and unlocking the electrical lock. The electrical key can include an energy-transfer unit including a magnetic core and a coil wrapped around the magnetic core, a pulse generator configured to generate a first pulse sequence including alternating pulse on and pulse off cycles and a second pulse sequence comprising a continuous pulse train, a modulator driver configured to modulate a voltage or current on the coil wrapped around the magnetic core using the generated first pulse sequence. The modulator driver is further configured to modulate the voltage or current on the coil using the second pulse sequence to facilitate transferring of energy from the electrical key to the electrical lock. The electrical key can further include a measurement module configured to measure a current or voltage on the coil excited by the voltage or current, respectively, modulated using the first pulse sequence, a key-position determination module configured to determine a relative position between the electrical key and the electrical lock based on the measured current or voltage, and a communication interface for communicating with the electrical lock to facilitate the locking and unlocking of the electrical lock. The electrical lock can include a second energy-transfer unit comprising a second magnetic core and a second coil wrapped around the second magnetic core and a second communication interface for communicating with the electrical key.

One embodiment of the present invention provides a computer-executed method for locking and unlocking an electrical lock using an electrical key. The method can include generating, by the electrical key, a first pulse sequence comprising alternating pulse on and pulse off cycles; and modulating, using the generated first pulse sequence, a voltage or current on a coil wrapped around a magnetic core. The coil and the magnetic core are located within a casing of the electrical key. The method can include measuring a current or voltage on the coil excited by the modulated voltage or current, respectively; and, in response to determining that the electrical key is substantially close to the electrical lock based on the measured current or voltage, generating a second pulse sequence comprising a continuous pulse train. The method can include modulating the voltage or current on the coil using the second pulse sequence, thereby facilitating energy being transferred from the electrical key to the electrical lock. The method can further include transmitting, from the electrical key to the electrical lock, a locking or unlocking command, thereby facilitating locking or unlocking, respectively, of the electrical lock.

BRIEF DESCRIPTION OF THE FIGURES

In the figures, like reference numerals refer to the same figure elements.

DETAILED DESCRIPTION

Figure 2:
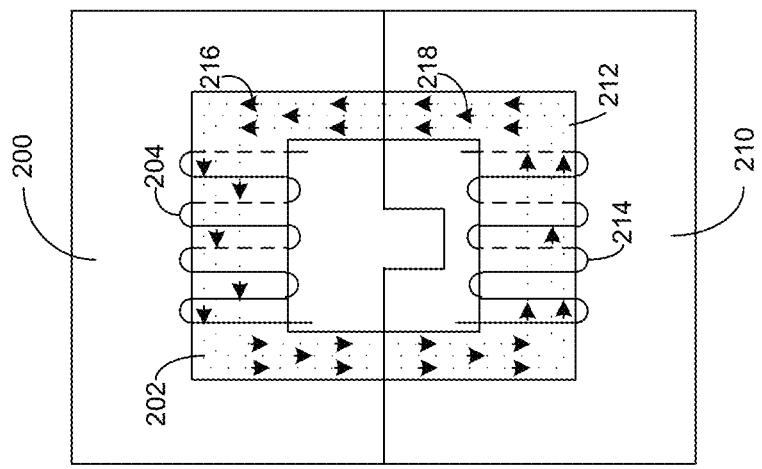
FIG. 2 illustrates the magnetic coupling between resonance components on the electrical lock and key, according to one embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a novel electrical lock-and-key system. The electrical lock-and-key system can include an electrical key capable of automatically locking and unlocking the electrical lock. Moreover, the electrical key can automatically verify whether the locking and unlocking operation is authorized. The electrical lock can be passive (i.e., without a power source). During the locking and unlocking operations, the electrical key can provide power to the electrical lock wirelessly to facilitate operations of the electrical lock. More specifically, both the electrical key and lock can include coils and magnetic cores for facilitating the induction-based position detection and wireless charging. The shapes of the coils and magnetic cores are specially designed to ensure high-efficiency power transfer and the compact size of the lock and key. During operation, the control circuit in the electrical key generates and transmits pulse-width modulated (PWM) signals and monitors the electrical voltage across the coil wrapped around the magnetic core inside the electrical key. By detecting changes in the characteristic pulses arising from electromagnetic resonance between the magnetic cores, the control circuit in the key can determine that the key head is correctly inserted into the lock core. The control circuit can further generate and transmit periodical pulse sequences and communicate with the control circuit inside the lock to send the unlocking command. In response to receiving the unlocking command, the control circuit in the electrical lock verifies the identifier of the key and performs the unlocking operation. During locking, a user removes the key head from the lock core, resulting in changes in waveform of the characteristic pulses. Upon detecting such changes, the control circuit in the electrical key sends a locking command to the electrical lock, which performs the locking operation subsequent to receiving the locking command.

Smart Lock-and-Key System

To prevent possible human switching errors, transmission substations or switching/dispatching centers can implement a smart-interlock system (SIS), which performs a "five-step" method to ensure switching safety. The five steps for performing safe switching include: a simulation step, a switching-order transmission step, a device ID verification step, an operation-permission revalidation step, and a switching-completion step.

Some SIS systems rely on the smart key for verifying the device ID and the switching order, whereas the lock itself can be a simple mechanical lock. The locking and unlocking of the physical lock may be performed manually by a human user. For example, a human operator may need to physically insert the key head into the lock core and rotate the key head to unlock the lock. However, the mechanical locking and unlocking mechanism can be unreliable. In some embodiments, both the key and the lock can be "smart," meaning that the locking and unlocking can now be performed electrically, e.g., by exchanging electrical signals. Both smart key and lock would require power to operate.

A typical smart lock-and-key system can include an electrical key and a lock operable by the electrical key. The lock can be part of a piece of equipment or can be removable (e.g., a padlock). In some embodiments, the lock can be passive, meaning it is not connected to a power source and does not have a built-in battery. This can reduce the cost of the locks. On the other hand, most electrical keys can include a built-in or removable battery that can be charged once its power is depleted. In other words, the electrical keys are active. Moreover, although the lock is not powered by an external power source or a battery, operations of the lock can require power. For example, the control and communication modules within the lock need power to operate. Moreover, the locking and unlocking operations may also require power. In some embodiments, the electrical key can provide power to the electrical lock during operation, when the electrical key is inserted into the lock core.

There are two types of wireless power-transfer or charging technologies, the inductive power-transfer technology and the magnetic-resonance power-transfer technology. The inductive technology uses an electromagnetic field to transfer energy between two objects through electromagnetic induction. The resonance technology can involve two copper coils, with one attached to the power-sending device and the other one attached to the power-receiving device. When objects of the same resonance frequency are placed close to each other, the energy produced is transferable between the objects. In some embodiments, the electrical key can be configured to transfer power to the electrical lock using the inductive power-transfer technology.

Figure 1A:
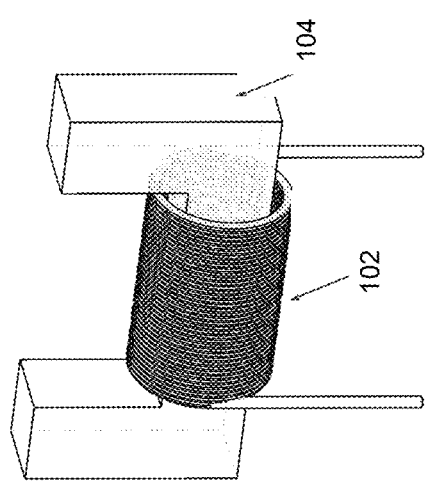
FIG. 1A illustrates an exemplary resonance component in an electrical key or lock, according to one embodiment.
Figure 1B:
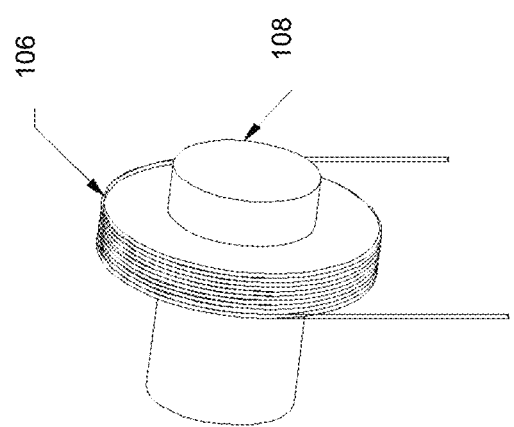
FIG. 1B illustrates an alternative resonance component in an electrical key or lock, according to one embodiment.

FIG. 1A illustrates an exemplary resonance component in an electrical key or lock, according to one embodiment. In FIG. 1A, resonance component 100 can include coil 102 and magnetic core 104. In some embodiments, magnetic core 104 can be U-shaped and coil 102 can be configured to wrap around at least a portion of magnetic core 104. In the example shown in FIG. 1A, coil 102 wraps around the bottom portion of U-shaped magnetic core 104. In practice, coil 102 can be configured to wrap around any portion of U-shaped or cylindrical magnetic core 104. In alternative embodiments, magnetic core 104 can be cylindrical, as shown in FIG. 1B. FIG. 1B illustrates an alternative resonance component in an electrical key or lock, according to one embodiment. In FIG. 1B, a coil 106 wraps around at least a portion of a cylindrical magnetic core 108.

FIG. 2 illustrates the magnetic coupling between resonance components on the electrical lock and key, according to one embodiment. In the example shown in FIG. 2, electrical key 200 can be placed adjacent to electrical lock 210. The resonance component included in electrical key 200 can include U-shaped magnetic core 202 and coil 204, and the resonance component included in electrical lock 210 includes U-shaped magnetic core 212 and coil 214. When electrical key 200 and electrical lock 210 are placed adjacent to each other in such a way as shown in FIG. 2, the ends of U-shaped magnetic core 202 are placed substantially against corresponding ends of U-shaped magnetic core 212. This way, U-shaped magnetic cores 202 and 212 substantially form a closed loop.

The closed loop can ensure that the majority of the magnetic field generated by one coil (e.g., coil 204) can be induced from the corresponding magnetic core (e.g., magnetic core 202) to the other magnetic core (e.g., magnetic core 212), with a reduced amount of leaking. The magnetic field lines (e.g., field lines 216 and 218) shown in FIG. 2 demonstrate that the majority of the magnetic field has been confined by the magnetic cores forming the closed loop. Compared to conventional charging technologies, where no magnetic core is implemented, the U-shaped magnetic cores and their strategically designed placement reduce the leakage of the magnetic field during the inductive coupling, hence reducing the amount of power leakage. Note that power leakage not only reduces power efficiency but can also cause overheating of the devices.

Figure 3:
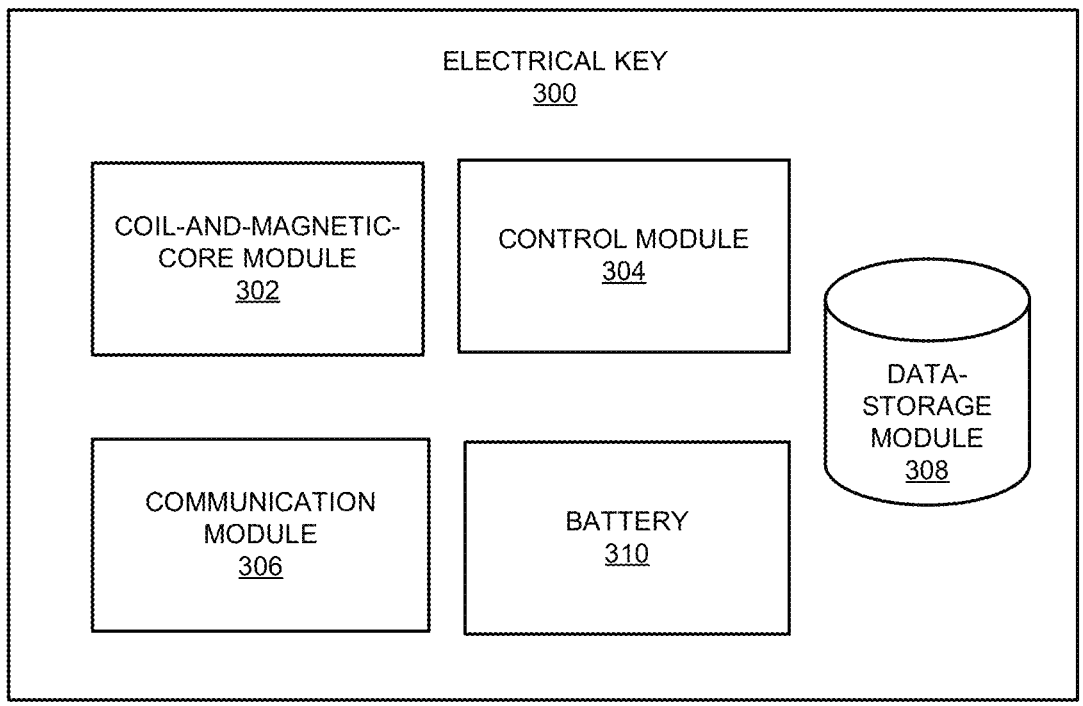
FIG. 3 illustrates an exemplary block diagram of an electrical key, according to one embodiment.

FIG. 3 illustrates an exemplary block diagram of an electrical key, according to one embodiment. Electrical key 300 can include a coil-and-magnetic-core module 302, a control module 304, a communication module 306, a data-storage module 308, and a battery 310.

Coil-and-magnetic-core module 302 can include the physical medium (e.g., a metallic coil and a magnetic core) for transferring power between the lock and key. In some embodiments, the magnetic core can be U-shaped and the metallic coil (e.g., a Cu coil) can be wrapped around the U-shaped magnetic core). The electrical key can be designed in such a way that, during locking or unlocking, the ends of the U-shaped magnetic core of the key substantially face the corresponding ends of the U-shaped magnetic core of the lock.

Control module 304 can be responsible for controlling the locking and unlocking operations of electrical key 300, including operations of the various modules within electrical key 300. More specifically, during operation, control module 304 can detect changes of electrical current in the coil (which can be the result of electrical key 300 being inserted into the electrical lock or being removed from the electrical lock. Based on such changes, control module 304 can determine whether electrical key 300 is inserted into or removed from the electrical lock. Moreover, control module 304 can also be responsible for validating the identity of the lock.

Communication module 306 can be responsible for transmitting and receiving communications and/or control signals. Communication module 306 can facilitate communications between electrical key 300 and a corresponding electrical lock. For example, during operation, communication module 306 can transmit the key identifier of electrical key 300 to the lock to allow a control module of the electrical lock to validate the identity of electrical key 300. Moreover, communication module 306 can also transmit the lock or unlock commands to the electrical lock, thus resulting in the consequential locking or unlocking of the electrical lock.

In some embodiments, the communication between electrical key 300 and the corresponding electrical lock can use radio frequency (RF) signals, such as low frequency (LF) RF signals. The frequency of the LF RF signals can range between 120 and 150 kHz. Moreover, communication module 306 can further include an encryption module such that the RF communications can be encrypted. For example, electrical key 300 and the corresponding lock may exchange encryption keys during system initialization, and subsequent communication between electrical key 300 and the electrical lock can be encrypted using the encryption keys. In one embodiment, when an electrical key is used with an electrical lock for the first time, the electrical key can initiate an authentication process. In response, the electrical lock can generate an authentication code based on predetermined logic, and the electrical key and lock can authenticate each other based on the authentication code. Subsequent to the mutual authentication, the electrical key and lock can negotiate an encryption key (e.g., a symmetric key) that can be used to encrypt the communication between the electrical key and lock. In the event of the electrical key being lost or the lock core changed, the electrical key can be reset (e.g., using a special application running on a computer) to the engineer mode and the authentication code stored in the lock core can be erased, thus allowing a new authentication process to be performed.

In addition to communications between electrical key 300 and the electrical lock, communication module 306 can also facilitate the communication between electrical key 300 and a remote controller. For example, communication module 306 can transmit an identifier of the electrical lock to the remote controller to allow the remote controller to run a simulation to ensure that the unlocking operation is allowed. In some embodiments, the communication between electrical key 300 and the corresponding electrical lock can be encrypted. For example, electrical key 300 and the corresponding lock may exchange encryption keys during system initialization, and subsequent communication between electrical key 300 and the electrical lock can be encrypted using the encryption keys.

Communication module 306 can also include a wired interface (e.g., a universal serial bus (USB) interface, which allows electrical key 300 to interface with a computer (e.g., a personal computer (PC) or a server). A system administrator can then access the internal modules of electrical key 300 to perform various operations, such as writing data or placing electrical key 300 in an engineer mode.

Data-storage module 308 can be responsible for storing instructions that can be loaded into the processors in control module 304 and communication module 306 to be executed by those processors to facilitate various aforementioned operations. Moreover, other information (e.g., encryption keys, operation rules, etc.) that are needed for the operations of electrical key 300 can also be stored in data-storage module 308. Battery 310 can provide energy needed by various modules in electrical key 300 once electrical key 300 is powered up. In addition to the various modules shown in FIG. 3, electrical key 300 can also include a display module that can display a user interface facilitating the user to operate electrical key 300. Battery 310 can also provide power needed for the locking and unlocking operations of the electrical lock. Battery 310 can include any type of batteries, such rechargeable batteries and non-rechargeable batteries.

Figure 4:
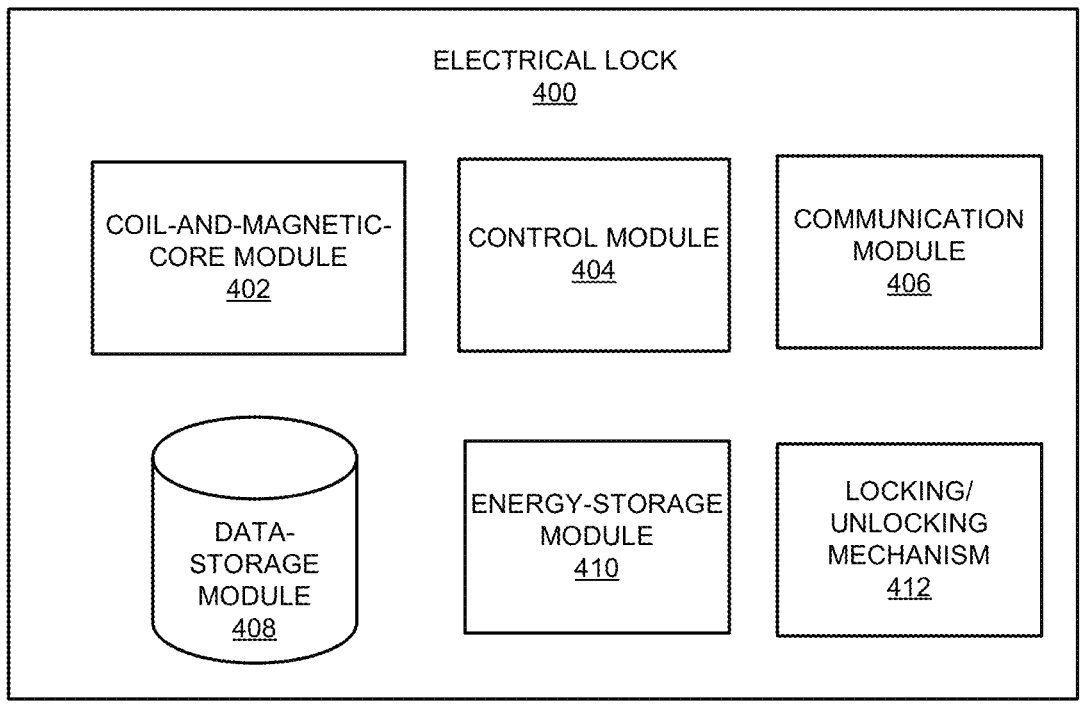
FIG. 4 illustrates an exemplary block diagram of an electrical lock, according to one embodiment.

FIG. 4 illustrates an exemplary block diagram of an electrical lock, according to one embodiment. Electrical lock 400 can include a coil-and-magnetic-core module 402, a control module 404, a communication module 406, a data-storage module 408, an energy-storage module 410, and a locking/unlocking mechanism 412.

Coil-and-magnetic-core module 402 can be similar to coil-and-magnetic-core module 302 shown in FIG. 3. More specifically, coil-and-magnetic-core modules 302 and 402 can be configured in such a way that when the key head of electrical key 300 is inserted into the lock core of electrical lock 400, the corresponding ends of the magnetic cores are placed substantially adjacent to each other, thus forming a closed loop of magnetic cores.

Control module 404 can be responsible for controlling operations of electrical lock 400. More specifically, control module 404 can validate an electrical key based on a key identifier received from the electrical key. Moreover, control module 404 can also detect electrical pulses received from the electrical key in order to determine the position of the electrical key (e.g., whether the key is inserted into the lock core).

Communication module 406 can be similar to communication module 306 shown in FIG. 3. More specifically, communication modules 306 and 406 can facilitate communications between electrical key 300 and electrical lock 400. In some embodiments, communication module 406 can transmit and receive RF signals. In further embodiments, messages exchanged between communication modules 306 and 406 can be encrypted.

Data-storage module 408 can be similar to data-storage module 308 shown in FIG. 3. Data-storage module 408 can be responsible for storing instructions that can be loaded into the processors in control module 404 and communication module 406 to be executed by those processors to facilitate various operations of electrical lock 400. Moreover, other information (e.g., encryption keys, operation rules, etc.) that are needed for the operations of electrical lock 400 can also be stored in data-storage module 408.

Energy-storage module 410 can be responsible for temporary storage of a small amount of energy, which can be used to facilitate the operations (e.g., a locking operation) of electrical lock 400 after the electrical key leaves electrical lock 400. Unlike battery 310 in electrical key 300 that can store electrical energy indefinitely, energy-storage module 410 can only store electrical energy for a short duration (e.g., a few seconds). In some embodiments, energy-storage module 410 can include a capacitor. Locking/unlocking mechanism 412 is used to lock and unlock electrical lock 400. In some embodiments, locking/unlocking mechanism 412 can include a movable mechanical component that moves responsive to a locking or unlocking command, thus resulting in the locking or unlocking of electrical lock 400. Energy needed for moving the movable mechanical component can be obtained from energy-storage module 410.

Locking and Unlocking Operations

Before an electrical key and lock set can work together, they need to go through an initialization process. In some embodiments, an application running on a computing device (e.g., a personal computer (PC), a server, or a tablet computer) can initialize the electrical key and lock before they are put to use. Initialization allows the electrical key and lock to validate the authenticity of each other, thus preventing usage of counterfeit equipment. Moreover, to ensure the security of communications between the electrical key and the corresponding electrical lock, during initialization, the electrical key and the electrical lock can negotiate an encryption key (e.g., a symmetrical or asymmetrical key) such that the communications between the key and lock can be encrypted. This can prevent malicious users from hacking into the communication link to manipulate operations of the electrical key or lock.

Figure 5:
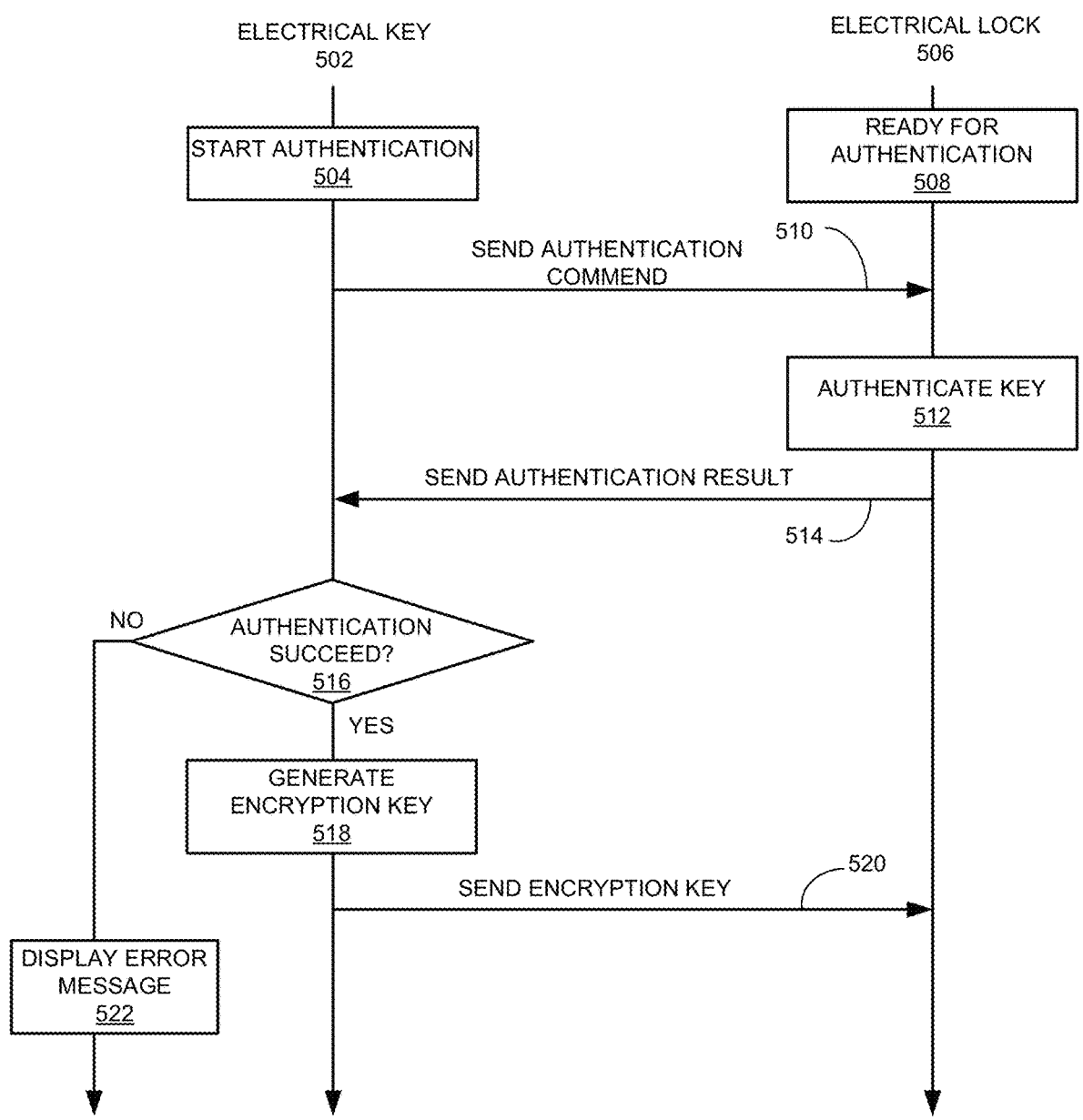
FIG. 5 presents a flowchart illustrating an exemplary initialization process between the electrical lock and key, according to one embodiment.

FIG. 5 presents a flowchart illustrating an exemplary initialization process between the electrical lock and key, according to one embodiment. During operation, electrical key 502 starts an authentication process (operation 504), which can involve running a self test. In the meantime, electrical lock 506 gets ready for the authentication process (operation 508). To facilitate the initial authentication between the lock and key, both the lock and key can be coupled to a computing device (e.g., a personal computer (PC) or a computer server). More specifically, the electrical key or lock can be coupled to the PC via a wired or wireless connection. For example, the electrical key or lock can be coupled to the PC using a universal serial bus (USB) cable. Such coupling can provide power to the electrical lock.

Electrical key 502 sends an authentication command to electrical lock 506 (operation 510). In response, electrical lock 506 authenticates electrical key 502 (operation 512). In some embodiments, electrical lock 506 can authenticate electrical key 502 based on a unique identifier assigned by the manufacturer to electrical key 502. Electrical lock 506 sends the authentication result to electrical key 502 (operation 514). Based on the received authentication result, electrical key 502 determines whether the authentication succeeds (operation 516). In some embodiments, in addition to the authentication result, electrical lock 506 can further send its own unique identifier to electrical key 502 to allow electrical key 502 to authenticate electrical lock 506.

Subsequent to successful mutual authentication, electrical key 502 can generate an encryption key (operation 518) and send the generated encryption key to electrical lock 506 (operation 520). Otherwise, electrical key 502 can display an error message indicating that the authentication fails (operation 522). Various types of encryption key can be used to facilitate the secure communication between electrical key 502 and electrical lock 506, including both the asymmetrical encryption keys and the symmetrical encryption keys. In some embodiments, the communication between electrical key 502 and electrical lock 506 can be encrypted using a 128-bit AES (Advanced Encryption Standard) key.

Figure 6:
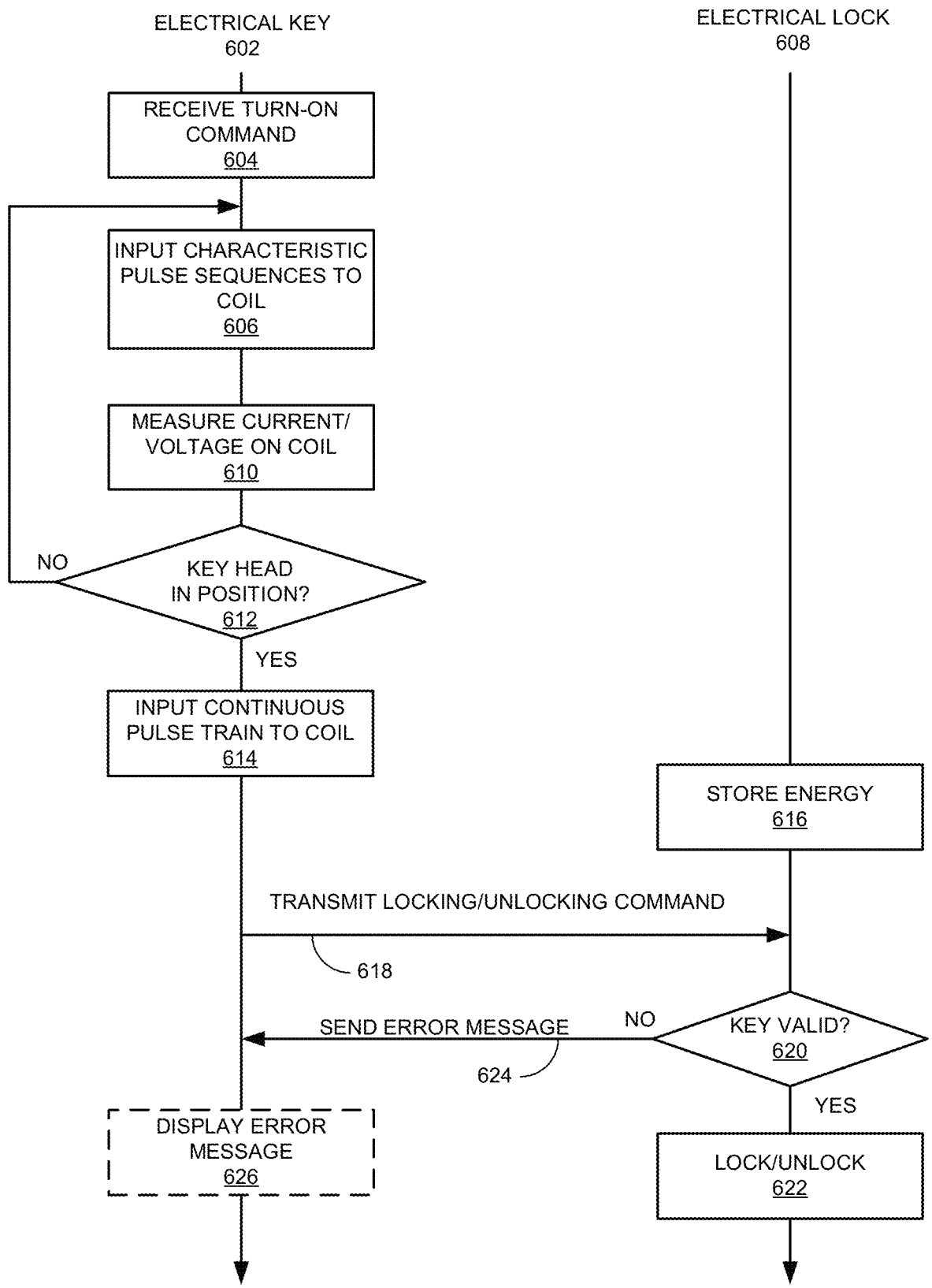
FIG. 6 illustrates exemplary locking and unlocking operations of the electrical lock-and-key system, according to one embodiment.

Once the lock and key have authenticated each other, they can operate together. More specifically, the electrical key can be used to lock and unlock the electrical lock. FIG. 6 illustrates exemplary locking and unlocking operations of the electrical lock-and-key system, according to one embodiment. During operation, electrical key 602 receives a turn-on command from an operator (operation 604). Note that electrical key 602 is normally in an "off" mode in order to save power. A human operator can turn on electrical key 602 by pushing a button, sliding a lever, or using other suitable mechanisms for turning on power of an electrical device. Moreover, certain user authentication procedures (e.g., entering a password or submitting biometric information) may also be required in order for the users to use electrical key 602.

Figure 7A:
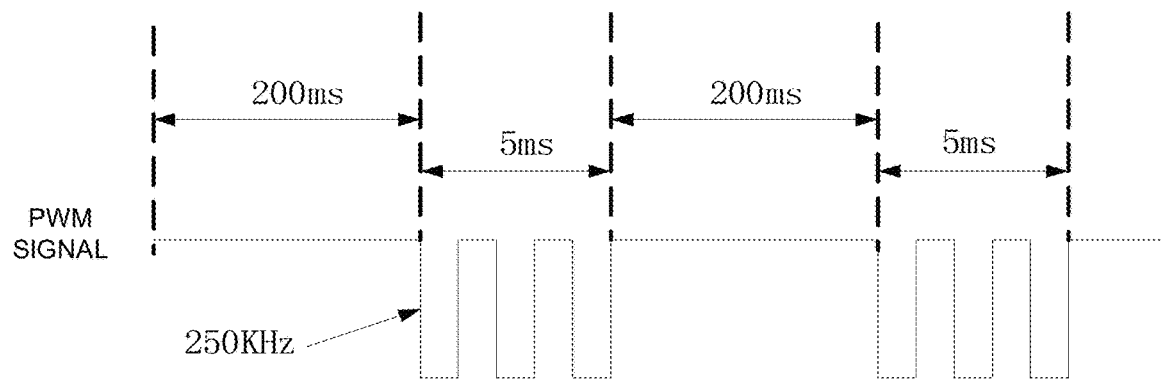
FIG. 7A shows an exemplary characteristic pulse sequence, according to one embodiment.

In response to being turned on, electrical key 602 starts to input characteristic pulse sequences to a coil wrapped around a magnetic core within electrical key 602 (operation 606). For example, a PWM signal can be used to modulate a voltage applied across the coil, resulting in the current flowing through the coil to have modulated amplitude. In some embodiments, the waveform of the PWM voltage across the coil can include a sequence of periodical pulses; such a waveform is referred to as a characteristic pulse sequence. More specifically, the control module in electrical key 602, which can be similar to control module 304 shown in FIG. 3, can generate the PWM signal and use such signal to modulate the voltage applied to the coil. FIG. 7A shows an exemplary characteristic pulse sequence, according to one embodiment. In this example, the characteristic pulse sequence can be viewed as a product of a continuous pulse train and a periodical gating signal. The period of the gating signal can be between a few tens of milliseconds to a few seconds. In one embodiment, the period can be about 200 ms. The duty cycle of the gating signal can be kept relatively small (e.g., between 1% and 10%). The low duty cycle can ensure low power consumption of the electrical key. In the example shown in FIG. 7A, the characteristic pulse sequence can include a number of "pulse on" cycles interleaving a number of "pulse off" cycles. Each "pulse on" cycle can include a number (e.g., two) of pulses, whereas each "pulse off" cycle only includes a DC signal. The duration of each "pulse on" cycle can be a few milliseconds (e.g., 5 ms), whereas the duration of each "pulse off" cycle of the pulse sequence can be a few hundred milliseconds (e.g., 200 ms). In the example shown in FIG. 7A, the square wave in the "pulse on" cycle can have a frequency of about 250 KHz. It is also possible that the characteristic pulse sequence is used to modulate a current inputted into the coil. Similarly, the voltage across the coil will be modulated.

Figure 7B:
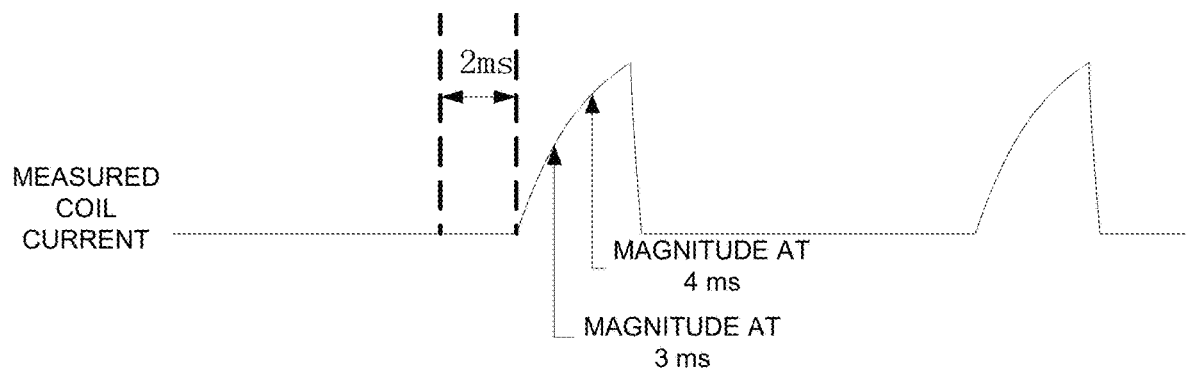
FIG. 7B illustrates the measured waveform of the current flow through the coil in an electrical key subsequent to the electrical key coupling to an electrical lock, according to one embodiment.

Returning to FIG. 6, subsequent to inputting the characteristic pulse, electrical key 602 measures the current or voltage on its coil (operation 610) to determine whether the key head of electrical key 602 is inserted correctly into the lock core of electrical lock 608 (operation 612). Note that, to lock or unlock electrical lock 608, a human operator needs to insert the key head of electrical key 602 into the lock core of electrical lock 608. As discussed before, when the key head is inserted into the lock core correctly, the U-shaped magnetic cores in electrical key 602 and electrical lock 608 can form a closed loop, thus resulting in changes in the inductance of the coil in electrical key 602. Similarly, if the magnetic cores are cylindrical, when their ends are brought close to each other, the inductance of the coil will change. The inductance change can then cause changes in the amount of current flowing through the coil wrapped around the magnetic core. Hence, by measuring the amount of current across the coil in electrical key 602, one can determine the relative positions of electrical key 602 and electrical lock 608. This way, there is no longer the need of external magnetic sensors for detecting the relative positions of the lock and key. FIG. 7B illustrates the measured waveform of the current flow through the coil in an electrical key subsequent to the electrical key coupling to an electrical lock, according to one embodiment. From FIG. 7B, one can see that, instead of the square waves shown in FIG. 7A, a "pulse on" cycle for the current or voltage signal across the coil becomes a single pulse having an increased time constant. More specifically, the turn on time is delayed. Hence, by sampling the waveforms (especially the waveforms during the "pulse on" cycle) and comparing the waveforms to the characteristic waveform shown in FIG. 7A, the system can determine whether the key head is in place, i.e., whether the U-shaped magnetic cores in the key and lock form a substantially enclosed loop. In some embodiments, a microcontroller within the electrical key can sample the value of the voltage or current across its coil at one or more predetermined time instant (e.g., 3 or 4 ms subsequent to each falling edge). In further embodiments, the microcontroller of the electrical key can sample the coil current at a higher rate in order to extract more detailed waveform information. Alternatively, the microcontroller of the electrical key can measure the amplitude of the current across the coil. The increased inductance can reduce the coil current during the "pulse on" cycle. In one embodiment, if the microcontroller of the electrical key detects that the coil current during the "pulse on" cycle is below a predetermined threshold, the electrical key can determine that its key head has been inserted into the lock core, such that the U-shaped magnetic cores in the key and lock substantially form a closed loop. Note that it is also possible for the microcontroller to measure the coil current averaged over a particular time interval (e.g., during the "pulse on" cycle) to determine whether the key head is in position.

Figure 7C:
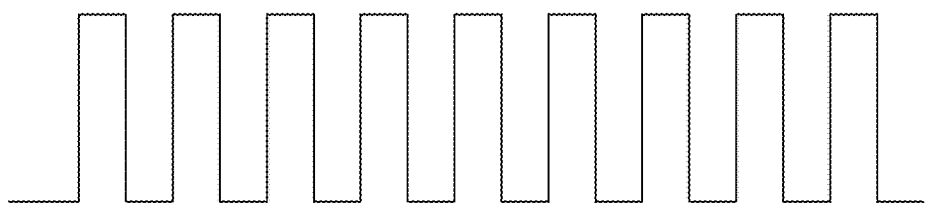
FIG. 7C shows an exemplary continuous pulse train, according to one embodiment.

Returning to FIG. 6, in response to determining that its key head is in position, electrical key 602 inputs a continuous pulse train, similar to the pulse train shown in FIG. 7C, to its coil (operation 614). For example, electrical key 602 can apply a voltage or current having a waveform similar to the one shown in FIG. 7C across the coil. Such a pulse train can also be generated by a pulse generator included in the control module of electrical key 602. Moreover, a modulator driver, which can also be a part of the control module, can modulate the voltage or current applied to the coil based on the characteristic pulse sequence. In the scenario where the characteristic pulse sequence is generated as a product of a continuous pulse train and a gating signal, the control module of electrical key 602 can turn off the gating signal such that the continuous pulse train can be used to modulate the voltage or current on the coil. In other words, the modulator driver now modulates the voltage or current on the coil based on the continuous pulse train. In response to determining that its key head is not yet in position, electrical key 602 continues to input the characteristic pulse sequences (operation 606) and measure the current/voltage in the coil (operation 610). Note that, due to the existence of the magnetic cores in electrical key 602 and electrical lock 608, the continuous pulses applied onto the coil in electrical key 602 can result in generation of electrical currents in the coil in electrical lock 608. In other words, electrical energy is being transferred from electrical key 602 to electrical lock 608. As discussed previously, the U-shaped magnetic cores in electrical key 602 and electrical lock 608 substantially form a closed loop, confining the magnetic field inside the magnetic cores. The reduced leakage of the magnetic field can result in higher energy transfer efficiency and a reduced amount of heat dissipation. Electrical lock 608 stores the transferred energy in its energy-storage module (operation 616). Note the energy-storage module in electrical lock 608 is not a battery and can only store the energy briefly.

Electrical key 602 can further transmit, over its communication interface, a locking or unlocking command to electrical lock 608 (operation 618). The communication interface can include an RF interface, and the locking/unlocking command can be transmitted using RF signals (e.g., LF RF signals). The locking/unlocking command can be encrypted using an encryption key that was previously negotiated between electrical key 602 and electrical lock 608. In some embodiments, a user of electrical lock 608 may enter the locking/unlocking command on electrical key 602 by pushing a physical button or by tapping an icon on a touchscreen of electrical key 602.

In certain applications (e.g., in a power plant or substation), prior to transmitting an unlocking command, electrical key 602 needs to determine whether an operation on a piece of equipment guarded by electrical lock 608 is authorized or a valid operation. For example, if a user attempts to perform a switching operation on a switch accessible only by unlocking electrical lock 608, electrical key 602 needs to determine whether such a switching violates any switching rules based on the current configuration or condition of all switches in the power plant or substation. Electrical key 602 can make such a determination by communicating with a central controller, which runs the system simulation in real time. Alternatively, electrical key 602 can include a simulation module that can run the simulation in the field. Electrical key 602 can be configured to send the unlocking command to electrical lock 608 if, and only if, it determines that the operation on the equipment is authorized or validated. This can effectively prevent misoperation of the equipment.

Upon receiving the locking/unlocking command, electrical lock 608 can check the validity of electrical key 602 based on a key identifier included in the locking/unlocking command (operation 620). For example, electrical lock 608 can determine whether electrical key 602 is authorized to lock or unlock electrical lock 608 based on the key identifier and a set of rules stored in the data-storage module of electrical lock 608. Note that not shown in FIG. 6 is the decryption operation performed by electrical lock 608. Encrypting the locking/unlocking command can prevent electrical lock 608 from receiving unauthorized locking/unlocking commands from malicious devices.

In response to determining that electrical key 602 is a valid key for issuing the locking/unlocking command, electrical lock 608 performs the locking/unlocking operation accordingly (operation 622). In response to determining that electrical key 602 is invalid, electrical lock 608 can send an error message to electrical key 602 (operation 624), indicating that the locking/unlocking operation fails. It is optional for electrical key 602 to display such an error message to the user (operation 626). In alternative embodiments, instead of a particular locking or unlocking command, electrical key 602 may only need to transmit, using an RF signal, its own identifier. By validating the key identifier, electrical lock 608 can change its state from a current state to an opposite state. For example, if electrical lock 608 is currently locked, by detecting that the key head of electrical key 602 is inserted in its lock core and by validating the key identifier of electrical key 602, electrical lock 608 can change its state from the locked state to an unlocked state. Similarly, if electrical lock 608 is currently unlocked, by detecting that the key head of electrical key 602 is inserted in its lock core and by validating the key identifier of electrical key 602, electrical lock 608 can change its state from the unlocked state to a locked state.

The locking and unlocking operation of electrical lock 608 can be performed by an appropriate locking/unlocking mechanism, depending on the type of lock. In some embodiments, the locking/unlocking mechanism of electrical lock 608 can include a sliding pin, which can cause electrical lock 608 to be locked or unlocked when pushed by a stopper. The rotation of the stopper can be driven by an electrical motor. The operation of the electrical motor relies on energy transferred from electrical key 602 to electrical lock 608.

Figure 8:
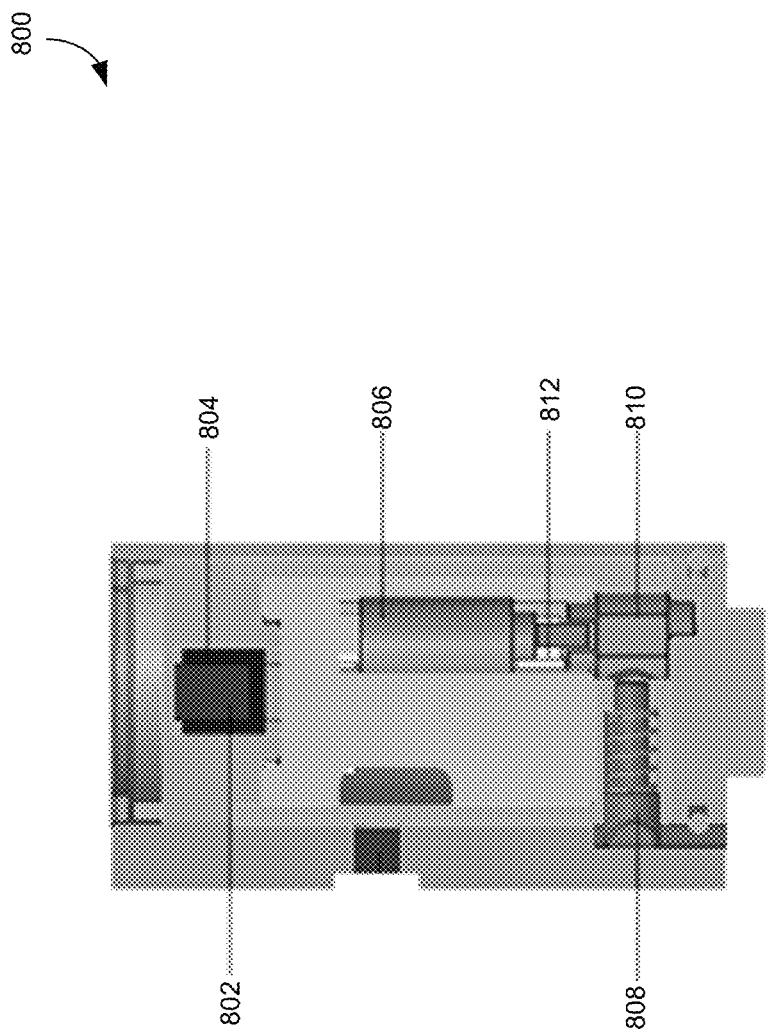
FIG. 8 illustrates the cross section of an exemplary electrical lock core, according to one embodiment.

FIG. 8 illustrates the cross section of an exemplary electrical lock core, according to one embodiment. In one embodiment, electrical lock core 800 can include a magnetic core 802, a coil 804, an electrical motor 806, a sliding pin 808, a stopper 810, and control circuit 812. Magnetic core 802 and coil 804 can be sealed inside the casing of electrical key 800. As discussed before, magnetic core 802 increases the energy transfer efficiency, thus significantly reducing the size of the magnetic core 802 and coil 804. Consequently, the overall size of electrical lock core 800 can also be reduced. Control circuit 812 can be responsible for receiving and validating the locking/unlocking command from a corresponding electrical lock and for controlling electrical motor 806. Motor 806 rotates stopper 810, thus causing lateral movement of sliding pin 808. Such lateral movement can then result in the locking and unlocking of the electrical lock. Note that the lock core shown in FIG. 8 can be used in various types of lock, such as a padlock or a latch lock. Moreover, in addition to the sliding pin/stopper combination, other locking/unlocking mechanisms can also be possible. The lock types or types of locking/unlocking mechanism do not limit the scope of embodiments of the present invention.

Once an electrical lock has been locked/unlocked by a user using an electrical key, a user may remove the electrical key from the electrical lock. To conserve battery power, it is desirable for the electrical key to stop inputting continuous pulses to its coil, because it is no longer necessary to provide power to the electrical lock. Similar to the process of detecting its key head inside the lock core, an electrical key can also detect its key head being removed from the lock core by monitoring electrical current flowing through its coil.

In alternative embodiments, the microcontroller of an electrical key may be configured to discontinue energy transfer prior to the electrical lock performing the locking/unlocking operations. More specifically, the electrical lock can include an energy-storage module that can store energy for a short time period, and such stored energy can be used by the electrical lock to perform the corresponding locking/unlocking operation. In some embodiments, the electrical key can be configured in such a way that each time it detects that its key head is removed from the electrical lock core, it can send a locking command to the electrical lock, such that the electrical lock will be locked subsequent to the removal of the electrical key.

Figure 9:
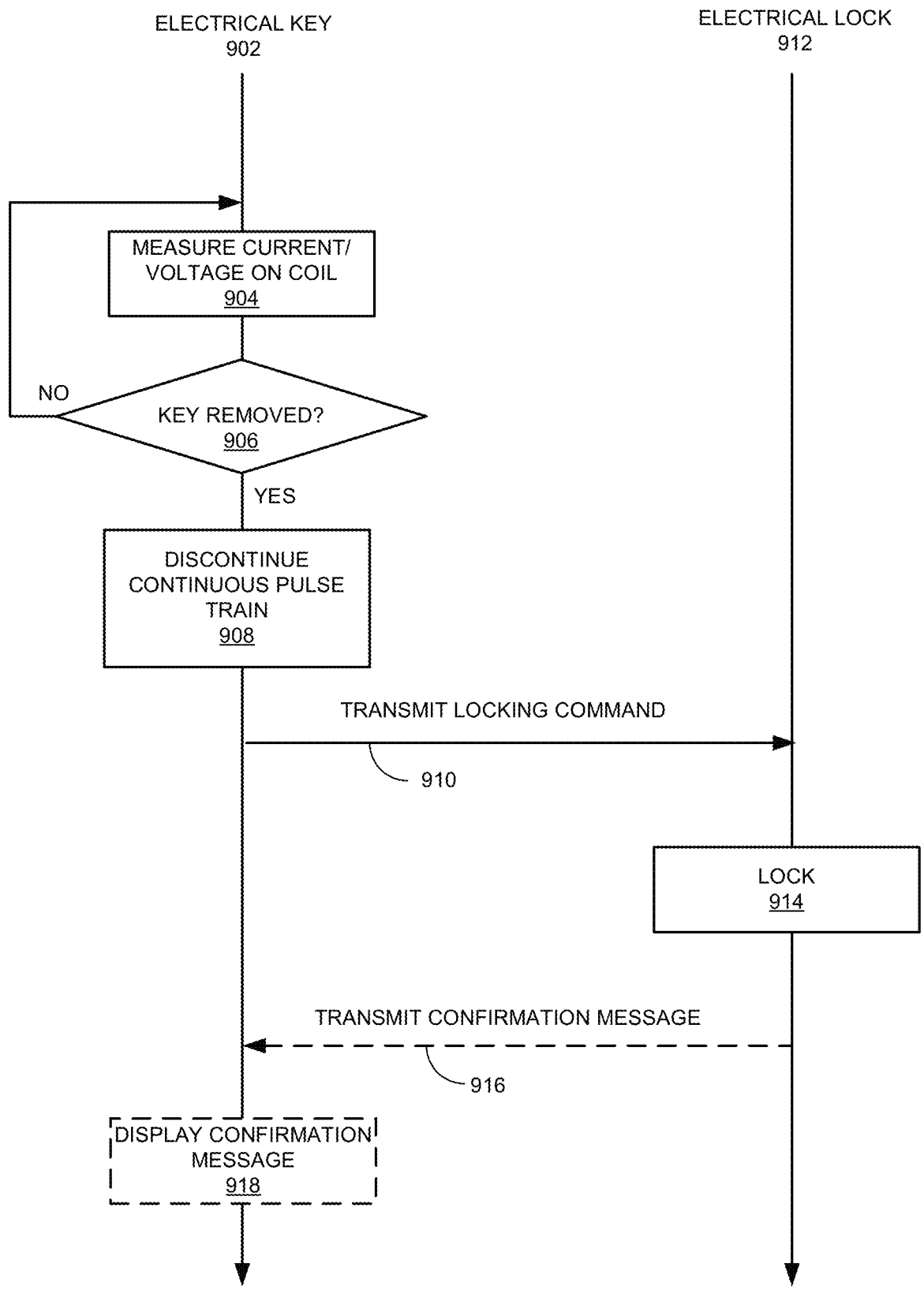
FIG. 9 illustrates an exemplary locking operation of the electrical lock-and-key system, according to one embodiment.

FIG. 9 illustrates an exemplary locking operation of the electrical lock-and-key system, according to one embodiment. During operation, electrical key 902 measures the current or voltage on its coil (operation 904) and determines whether electrical key 902 has been removed from electrical lock 912 (operation 906). As discussed previously, when the magnetic core and coil in electrical key 902 move away from the magnetic core and coil in electrical lock 912, the change in inductance can cause the waveform of the current or voltage on the coil inside electrical key 902 to change. For example, the reduced inductance can lead to a reduced time constant and a faster rising edge of the pulses. If electrical key 902 determines that it is still substantially close to electrical lock 912 (e.g., its key head is inserted into the lock core of electrical lock 912, electrical key 902 continues to monitor the coil current or voltage (operation 904). On the other hand, if electrical key 902 determines that its key head has been removed from the lock core, electrical key 902 can turn off the continuous pulse train (operation 908). Electrical key 902 can also transmit the locking command to electrical lock 912 (operation 910). Upon receiving the locking command, electrical lock 902 performs the locking operation (operation 914). Electrical lock 912 can optionally send a locking confirmation message to electrical key 902 (operation 916). Upon receiving the confirmation message, electrical key 902 can also optionally display the confirmation message (operation 918).

Figure 10:
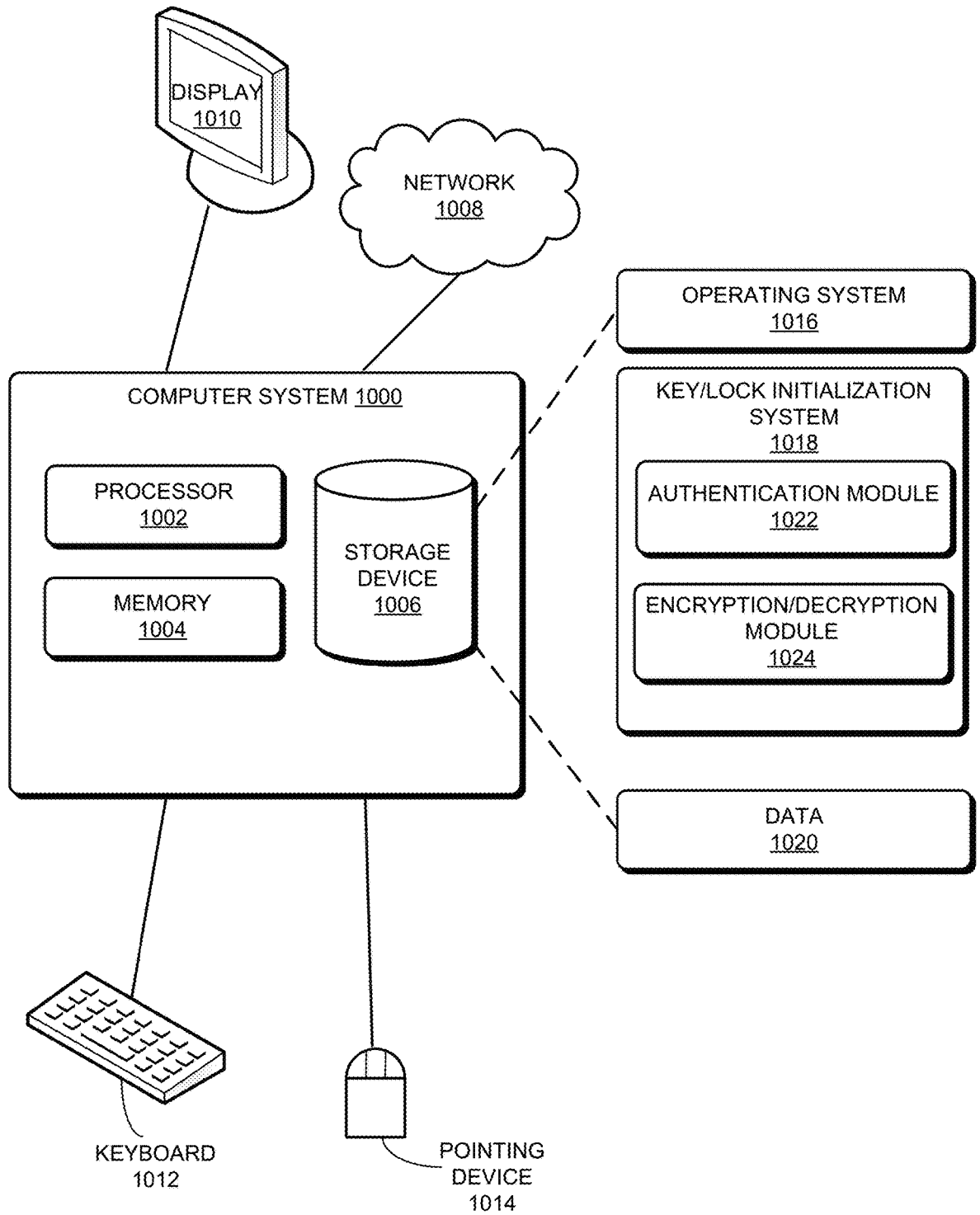
FIG. 10 illustrates an exemplary computer system that facilitates the initialization of the key/lock system, according to one embodiment.

FIG. 10 illustrates an exemplary computer system that facilitates the initialization of the key/lock system, according to one embodiment. In this example, a computer system 1000 includes a processor 1002, a memory device 1004, and a storage device 1006. Furthermore, computer system 1000 can be coupled to a network 1008, a display device 1010, a keyboard 1012, and a pointing device 1014. Storage device 1006 can store code for an operating system 1016, a key/lock initialization system 1018, and data 1020.

Key/lock initialization system 1018 can include instructions, which when executed by processor 1002 can cause computer system 1000 to perform methods and/or processes described in this disclosure. Specifically, key/lock initialization system 1018 can include instructions for implementing an authentication module 1022 and an encryption/decryption module 1024.

In general, embodiments of the present invention can provide a smart lock-and-key system that includes at least a battery-powered electrical key and a passive electrical lock. Once the key is engaged with the lock, energy can be transferred from the electrical key to the lock. Each key and lock can include a U-shaped magnetic core and coil sealed within the casing of the key or lock. The higher energy transfer efficiency provided by the U-shaped magnetic cores makes it possible for the key and lock to have a reduced size, thus improving user experience. The programmability of the key and lock also provide usage flexibility. In addition to a one-to-one matching relationship between the key and lock, it is also possible to have one-to-many, many-to-one, or many-to-many matching relationships between the keys and locks, as long as the locks and keys have been properly initialized. Moreover, the encryption/decryption modules within the lock and key can provide operation security.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. An electrical key for locking and unlocking an electrical lock, comprising:
   an energy-transfer unit comprising a magnetic core and a coil wrapped around the magnetic core;
   a pulse generator configured to generate a first pulse sequence comprising alternating pulse on and pulse off cycles and a second pulse sequence comprising a continuous pulse train;
   a modulator driver configured to modulate a voltage or current on the coil wrapped around the magnetic core using the generated first pulse sequence, and wherein the modulator driver is further configured to modulate the voltage or current on the coil using the second pulse sequence to facilitate transferring of energy from the electrical key to the electrical lock;
   a measurement module configured to measure a current or voltage on the coil excited by the voltage or current modulated using the first pulse sequence;
   a key-position determination module configured to determine a relative position between the electrical key and the electrical lock based on the measured current or voltage; and
   a communication interface for communicating with the electrical lock to facilitate the locking and unlocking of the electrical lock.

2. The electrical key of claim 1, wherein the measurement module is configured to sample a waveform associated with the excited current or voltage, and wherein the key-position determination module determines the relative position between the electrical key and the electrical lock based on the sampled waveform.

3. The electrical key of claim 1, wherein the pulse generator is configured to generate the second pulse sequence in response to the key-position determination module determining that the electrical key is substantially close to the electrical lock.

4. The electrical key of claim 1, wherein the communication interface comprises a radio frequency (RF) communication interface, and wherein the electrical key is configured to transmit a locking or unlocking command to the electrical lock via the communication interface.

5. The electrical key of claim 1, further comprising an encryption module configured to encrypt communications between the electrical key and the electrical lock.

6. The electrical key of claim 1, further comprising a battery module.

7. The electrical key of claim 1, wherein the magnetic core comprises a U-shaped magnetic core or a cylindrical magnetic core.

8. An electrical lock-and-key system, comprising:
an electrical lock and an electrical key capable of locking and unlocking the electrical lock;
wherein the electrical key comprises:
an energy-transfer unit comprising a magnetic core and a coil wrapped around the magnetic core;
a pulse generator configured to generate a first pulse sequence comprising alternating pulse on and pulse off cycles and a second pulse sequence comprising a continuous pulse train;
a modulator driver configured to modulate a voltage or current on the coil wrapped around the magnetic core using the generated first pulse sequence, and wherein the modulator driver is further configured to modulate the voltage or current on the coil using the second pulse sequence to facilitate transferring of energy from the electrical key to the electrical lock;
a measurement module configured to measure a current or voltage on the coil excited by the voltage or current modulated using the first pulse sequence;
a key-position determination module configured to determine a relative position between the electrical key and the electrical lock based on the measured current or voltage; and
a communication interface for communicating with the electrical lock to facilitate the locking and unlocking of the electrical lock; and
wherein the electrical lock comprises:
a second energy-transfer unit comprising a second magnetic core and a second coil wrapped around the second magnetic core; and
a second communication interface for communicating with the electrical key.

9. The electrical lock-and-key system of claim 8, wherein the measurement module is configured to sample a waveform associated with the excited current or voltage, and wherein the key-position determination module determines the relative position between the electrical key and the electrical lock based on the sampled waveform.

10. The electrical lock-and-key system of claim 8, wherein the pulse generator is configured to generate the second pulse sequence in response to the key-position determination module determining that the electrical key is substantially close to the electrical lock.

11. The electrical lock-and-key system of claim 8, wherein a respective communication interface comprises a radio frequency (RF) communication interface, and wherein the electrical key is configured to transmit a locking or unlocking command to the electrical lock via the communication interface.

12. The electrical lock-and-key system of claim 11, wherein the electrical lock further comprises a motor configured to facilitate locking or unlocking of the electrical lock based on the received locking or unlocking command, respectively.

13. The electrical lock-and-key system of claim 8, wherein the electrical key and lock each comprises an encryption module configured to encrypt communications between the electrical key and the electrical lock.

14. The electrical lock-and-key system of claim 8, wherein the electrical key further comprises a battery, and wherein the electrical lock further comprises an energy storage unit configured to temporarily store energy transferred from the electrical key.

15. The electrical lock-and-key system of claim 8, wherein the first or second magnetic core comprises a U-shaped magnetic core or a cylindrical magnetic core.

16. A computer-executed method for locking and unlocking an electrical lock using an electrical key, the method comprising:
generating, by the electrical key, a first pulse sequence comprising alternating pulse on and pulse off cycles;
modulating, using the generated first pulse sequence, a voltage or current on a coil wrapped around a magnetic core, wherein the coil and the magnetic core are located within a casing of the electrical key;
measuring a current or voltage on the coil excited by the modulated voltage or current, respectively;
in response to determining that the electrical key is substantially close to the electrical lock based on the measured current or voltage, generating a second pulse sequence comprising a continuous pulse train;
modulating the voltage or current on the coil using the second pulse sequence, thereby facilitating energy being transferred from the electrical key to the electrical lock; and
transmitting, from the electrical key to the electrical lock, a locking or unlocking command, thereby facilitating locking or unlocking, respectively, of the electrical lock.

* * * * *